Patented June 15, 1943

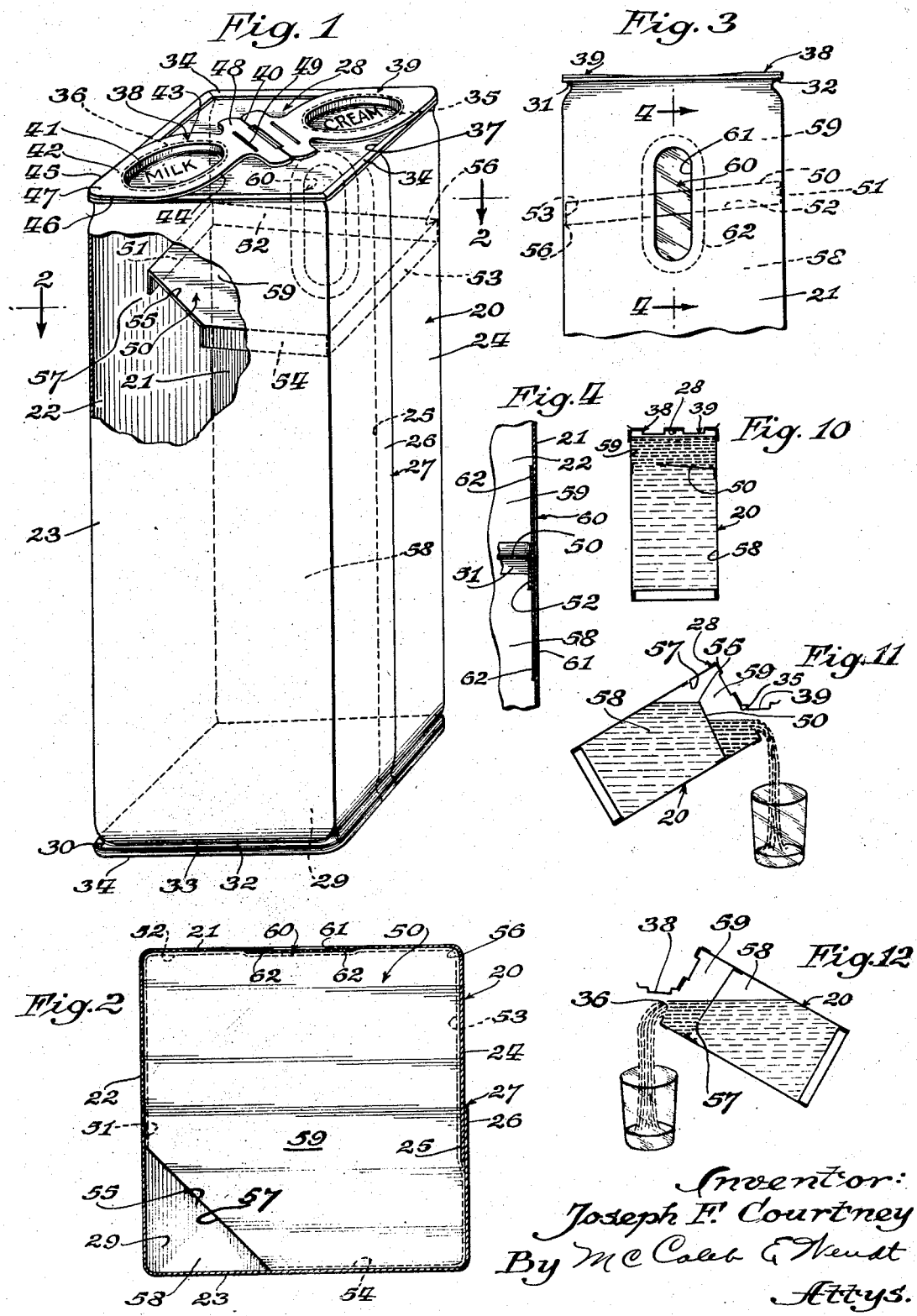

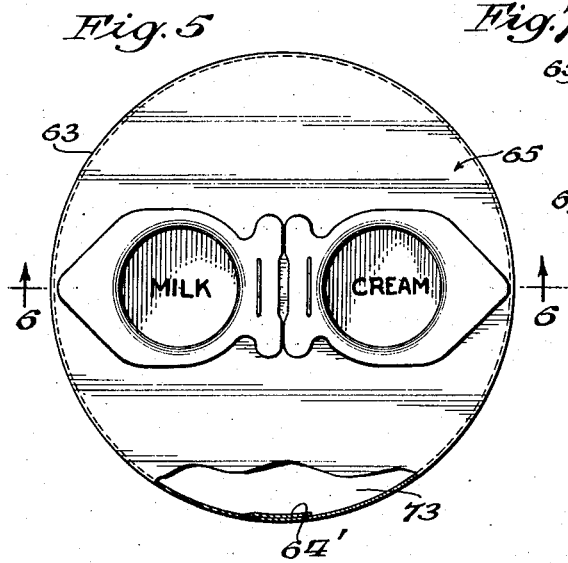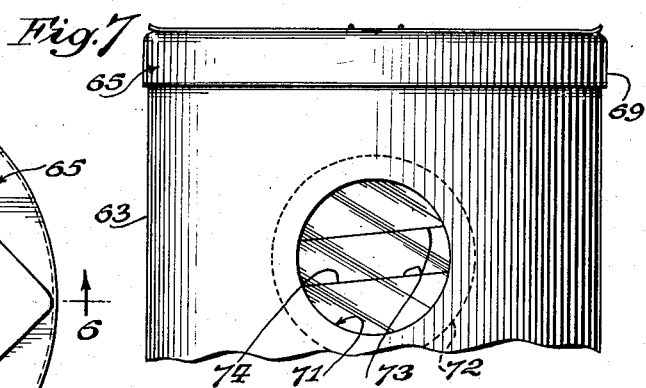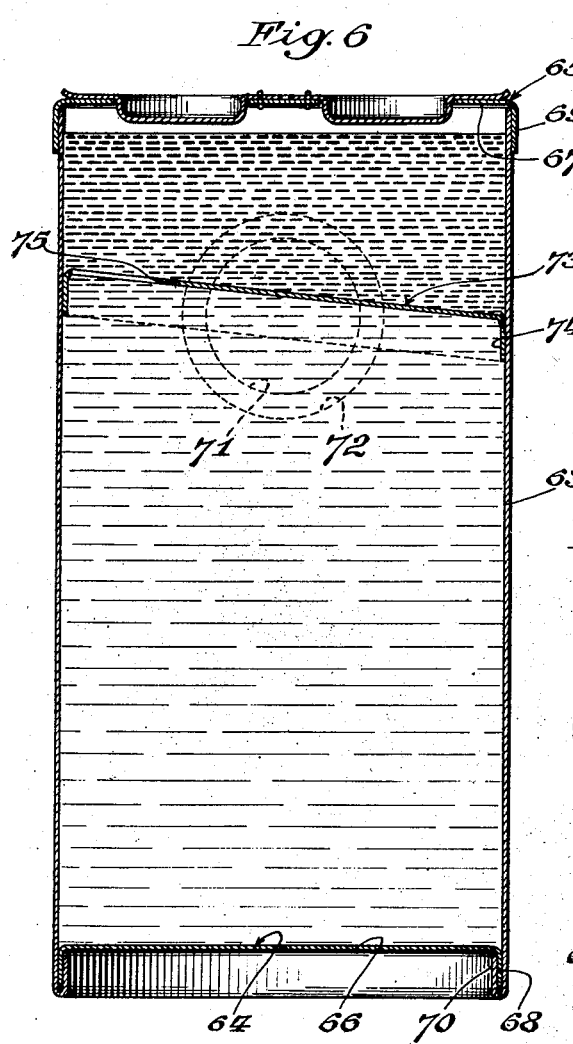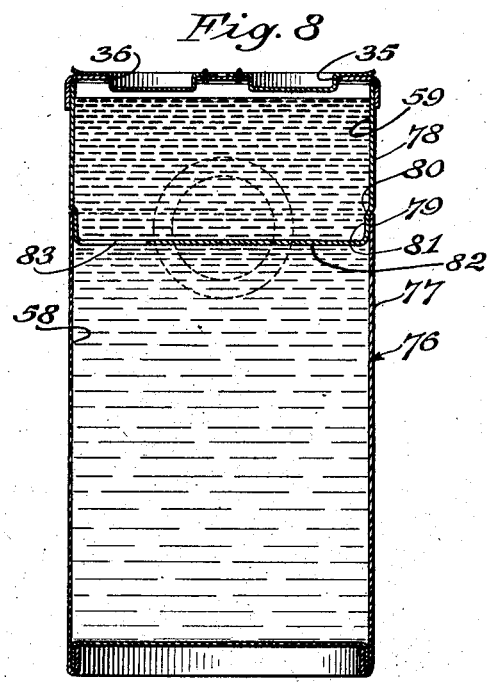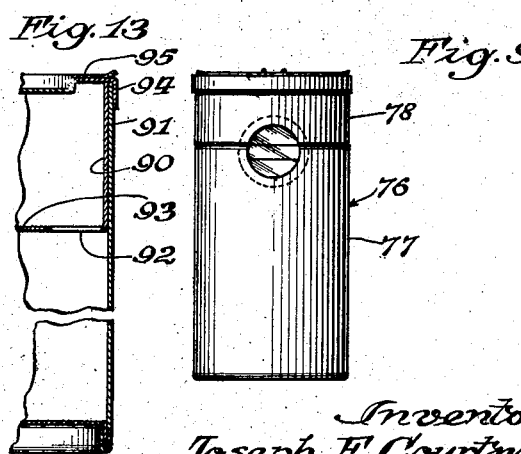

2,321,660

UNITED STATES PATENT OFFICE 2,321,660

MILK CONTAINER

Joseph F. Courtney, Chicago, Ill., assignor of one-half to Theron L. Hedgpeth, River Forest, Ill.

Application November 14, 1940, Serial No. 365,579

1 Claim. (Cl. 229—15)

The present invention relates to milk containers and is particularly concerned with milk containers made of such cheap materials such as paper or cardboard that the containers may be thrown away after use for one sale. The paper or cardboard milk containers of the prior art with which I am familiar are not so constructed that the cream may be separated from the milk by pouring the cream from the container.

Such paper containers of the prior art are usually of substantially the same cross section from top to bottom; and being opaque, the cream line cannot be seen, and it would be practically impossible to tell when all of the cream had been poured out if the containers were so arranged that cream could be poured out separately from the milk.

Furthermore, such paper containers of the prior art are not properly shaped with respect to the openings therein for the pouring of cream. In this respect, the paper containers differ from glass milk bottles which taper gradually toward the top and have a relatively large opening. Due to this shape, in a conventional glass milk bottle the free surface of the cream appears at the pouring opening before the bottle is tilted enough to have the cream pass into that part of the bottle which would be above the pouring opening when the bottle is horizontal.

Thus the glass milk bottles of the prior art permit the pouring of the cream under observation so that by care and skill it is possible to secure a certain amount of cream from the top of the milk bottle full of milk, but the paper containers of the prior art make it impossible to separate the cream from the milk by a simple pouring.

One of the objects of the invention is the provision of an improved milk container made of paper, fiber, or other suitable opaque material, which is so constructed that practically all of the cream may be poured off at will, or so that, if desired, milk and cream may be poured off simultaneously.

Another object of the invention is the provision of an improved milk container of the class described, which is so arranged that the cream and the milk can be seen, so as to make the product more salable than the devices of the prior art.

Another object of the invention is the provision of an improved milk container of opaque material, such as paper, or cardboard, which is so constructed that it may be readily filled with the usual filling machines, and so that it may be made to comply with all the laws and health regulations relating to milk containers.

Another object of the invention is the provision of an improved milk container of the class described, which is economical, sturdy, capable of being manufactured at such a low cost that it can be discarded after the milk has been removed, and capable of separating the milk and cream effectively and accurately.

Another object is the provision of a single-use milk container that is also adapted to facilitate the mixing of the milk and cream by simple inversion of the carton once or twice as in the case of a milk bottle.

Other objects and advantages of the invention will be apparent from the following description and the accompanying drawings, in which similar characters of reference indicate similar parts throughout the several views.

Referring to the drawings,

Fig. 1 is a view in perspective, partially broken away to show the structure of a cardboard milk container of substantially rectangular shape;

Fig. 2 is a horizontal sectional view, taken on the plane of the line 2—2 of Fig. 1, looking in the direction of the arrows;

Fig. 3 is a fragmentary front elevational view of the upper part of the container;

Fig. 4 is a fragmentary sectional view, taken on the plane of the line 4—4 of Fig. 3;

Fig. 5 is a top plan view of another modified form of milk container, which is circular in plan;

Fig. 6 is a vertical sectional view, taken on the plane of the line 6—6 of Fig. 5;

Fig. 7 is a fragmentary elevational view of the front side of such a milk container;

Fig. 8 is a view similar to Fig. 6 of another modification;

Fig. 9 is an elevational view, similar to Fig. 7, of the modification of Fig. 8;

Fig. 10 is a vertical sectional view, similar to Fig. 6, of that embodiment, showing the condition of the container when it is filled with milk, having cream at the top;

Fig. 11 is a similar view, showing the container tilted, in the act of pouring off the cream, but retaining the milk;

Fig. 12 is another view, showing the use of the invention when both milk and cream are desired.

Fig. 13 is a fragmentary axial sectional view taken through a milk container utilizing a simple construction in which two containers are secured together and simultaneously closed and sealed at the top to make the improved milk container.

Referring to Fig. 1, the rectangular form of paper milk container is preferred for the reason that it utilizes most efficiently the space which it requires for the storage of milk. These rectangular milk containers may be packed side by side to utilize all of the space in the box or crate, and when so packed the sides of one container are reinforced by the sides of other containers so that the complete assembly in turn is reinforced by the walls of the box or crate which support all of the containers.

I desire it to be understood, however, that my invention may be utilized in milk containers of various different shapes and sizes, and the rectangular and circular containers illustrated are merely exemplary of two of the most desirable shapes with which the invention may be used.

The milk container of Fig. 1 may be indicated in its entirety by the numeral 20. In the embodiment of Fig. 1 it includes the four side walls 21, 22, 23, and 24, which are formed out of one integral piece of paper bent at substantially right angles at the corners and having the ends 25 and 26 overlapped at 27 to form the side walls.

The container also includes the top wall 28, formed of one piece of cardboard, and the bottom wall 29 formed of another similar piece.

I desire it to be understood that the term cardboard as used in the present specification and claim merely refers to a piece of paper of the usual character of greater thickness or having a greater number of laminations secured together, so as to give increased tensile strength, stiffness, etc.

In other embodiments of the invention the entire container might be made of transparent resin materials provided such resin materials, such as Plasticel, Polistirene, Lucite, etc., can be purchased at such a reasonable price as would warrant their use.

The side walls 21—24 are preferably bent outwardly at 30 at the bottom, and 31 at the top, forming a shoulder 32, against which the bottom 29 and cover 28 may be seated. The side walls are then bent inwardly at 33 about the edge of the bottom 29 or top 28, the horizontal flange 34 engaging the top of the end wall 28 and outside the end wall 29 to secure these end walls to the side walls.

The securement at this point and at the overlapping joint 27 is by means of a suitable waterproof adhesive, and the entire container is suitably covered with wax or other waterproofing material capable of being reduced to a sterile condition so as to preserve the milk under the most sanitary conditions, as required by the regulations.

The top 28 is preferably provided with a pair of pouring and/or filling apertures 35, 36, indicated in dotted lines in Fig. 1; and these pouring apertures are preferably located as close to the corners of the rectangular container 20 as possible. This involves the location of the border of the openings 35 and 36 almost immediately adjacent the edge 37 of the inwardly extending flange 34.

The corners are best employed for pouring for the reason that when the container is disposed with a corner downward, all of the sides drain toward that corner, and substantially all of the liquid may be poured out easily through a corner opening.

These corner openings 35, 36 are preferably closed by a pair of cardboard closure members 38, 39, which may be made in one integral piece, or which may consist of two pieces separated at the abutting joint 40. As these closures are identical in Fig. 1, only one need be described in detail.

Each closure is preferably provided with a substantially cylindrical cup-like formation 41 carried by a radially outwardly extending flange 42, which engages the outside of the wall 28 when the cylindrical portion 41 is fitted into the opening 36, where it preferably has a close frictional fit.

The shape of the radial flange 42 is preferably circular at 43, 44, but the outline may correspond to the outline of the container at the sides 45, 46 of the flange, and the increased area at 47 may be used for a lifting tab. At its opposite end the closure 38 is provided with a supporting flange 48, which may be of substantially rectangular shape and elongated transversely of a line passing diagonally from one corner of the container to the other.

This tab 48 may be secured to the end wall 28 by a wire paper clip 49 of the usual shape, having an elongated body outside the corner and two legs extending through the flange 48 and end wall 28 and clamped over toward each other and toward the portion 49 inside the container.

The flange 48 is adapted to bend at a point located outwardly of the clip 49 when the tab 47 is pulled upward to open the opening 36. It is the tendency, however, of this flange to remain straight and hold the cover in the closed position with the cylindrical portion 41 frictionally engaged in the aperture 36.

The container is provided at a level corresponding substantially to the cream line, that is, the division line between the cream and milk, with a paper partition 50, which may be constructed of the same kind of cardboard as the container, and which is also preferably coated with wax.

This partition 50 is substantially rectangular in plan and is provided at its four borders with the depending attaching flanges 51—54.

In other embodiments of the invention the attaching flanges may extend upwardly into the cream part of the container. One corner of this otherwise rectangular partition 50 is preferably cut away along a diagonal line 55, leaving a triangular opening between the edge 55 and the side walls 22 and 23, under the cover opening 36. At all other points the attaching flanges 51—54 are securely fastened to the side walls 21—24 by a suitable waterproofing adhesive, and the partition is covered over all with wax.

This partition is preferably, but not necessarily, given a slight upward tilt from the corner 56 to the edge 55 adjacent the opening 57 for the purpose of facilitating the discharge of air bubbles from the lower side of the partition. This tilt may also aid the movement of cream from the lower or milk chamber 58 to the upper or cream chamber 59, but I have found that even with the horizontal partition the cream is separated from the milk in the course of a few hours, the cream line being substantially at the transverse plane of the partition 50.

The container is preferably, but not necessarily, provided with a cream and milk observation window, indicated at 60 (Fig. 3), and comprising a membrane of transparent material covering a window opening 61.

The membrane 60 may consist of any suitable transparent materials, such as a resin, or materials which are for sale in the open market under the names of Plasticel, Polistirene, Lucite, etc.

The window opening 60 is preferably small, in order that it may not weaken the box structure any more than necessary, and it may be elongated, as shown in Fig. 3, being provided with parallel sides and circular ends.

The transparent material of the window 60 is preferably of the same shape, but sufficiently larger, so that its border 62 overlaps the walls of the container on the inside of the window opening 61, where it may be secured by a suitable waterproof adhesive.

The attaching flange 52 of the partition 50 extends across the window, and in the embodiment shown in Fig. 3 it obscures the exact location of the cream line, but the color of the cream appears above the partition, and the color of the milk appears below it. If desired, the flange 52 may be cut away at the window opening 61, leaving only the edge of the partition adhering to the window 60. In any event, however, the partition preferably has a liquid-tight seal with the walls of the container all around its attaching flanges and edge, except at the opening 51, which is bordered by the edge 55.

The window 60 is also preferably covered with wax inside and out just like the rest of the container 20.

Referring to Figs. 5 and 6, this is a modification in which the container has a cylindrical wall 63 formed by a single piece of paper cardboard overlapping at 64' where the overlapping portions are secured together by suitable waterproof adhesive.

The end walls of this container may consist of shallow cup-shaped cylindrical members 64 and 65, each of which has a flat circular body portion 66 or 67 and a cylindrical flange 68 or 69. The size of the circular body portion 66 for the bottom, however, is small enough so that the flange 68 fits inside the side walls 63, where it is secured by the folding back of the portion 70 and the securing together of these parts with a suitable waterproof adhesive.

In this embodiment the top is again provided with the same apertures and closures located at opposite sides of the cover 65 and adapted to be used for the pouring of cream, or milk and cream combined.

The window opening 71 in this embodiment is made round, and it is covered with an overlapping piece of transparent material of the type previously mentioned, indicated at 72.

The partition 73 in this embodiment is substantially circular and provided with a depending cylindrical flange 74. Strictly speaking, when the partition 73 is disposed at a slight upward slope or angle, its shape would not be accurately cylindrical, but the nature of a section of a cylinder; but the angularity may be so slight that this change of shape may be immaterial. This partition 73 is again provided with an aperture 75 located at one side adjacent the periphery of the partition.

Referring to Figs. 8 and 9, this is another modification, in which the complete container, indicated at 76, is constructed of two nesting container portions 77 and 78. The lower one of these containers is of substantially the same construction as the one described in Fig. 6, but it is, of course, shorter, as the lower container 77 is merely intended to provide the milk chamber 58 and a sufficient amount of overlapping wall portion 79 for attachment to the upper chamber 78. The upper chamber has its top portion constructed exactly as described in respect to Fig. 6; but its bottom portion is formed with an inward offset at 80 and a cylindrical portion 81 of reduced diameter adapted to be nested in the upper end of the container 77.

These two containers are then secured together with a suitable waterproof adhesive, and the bottom 82 of the upper container 78 forms the partition in the complete milk container. This partition is again provided with an aperture 83 located at one side, and preferably adjacent one wall, for a purpose further to be described.

It should be noted that in all of these embodiments the partition may be kept perfectly horizontal, as shown in Fig. 8, as I have discovered that cream finds its way through the apertures in the partitions and produces a substantially perfect separation without any slope in the partition. The purpose of the slope of the partition, when used, is for the discharge of air bubbles from the lower chamber 58 into the upper chamber 59, when this container is filled by a nozzle through the top through one of the apertures 36 or 35.

It should be understood that these containers may be filled from the bottom, and the bottom of the container may be applied last, after the container has been filled with milk, in which case it would be unnecessary to provide the containers with any slope in the partition wall. Any bubbles might be liberated in any event by placing the containers on their sides, with the apertures of the partitions uppermost.

Referring to Figs. 10–12, these are diagrammatic illustrations, showing the mode of use of the milk containers. The milk container is filled with milk, either from the upper apertures or from the bottom, before the bottom wall is secured, and there is a certain amount of air space at the top of the milk in the container.

When the containers are filled with warm milk, as they usually are, the air space at the top of the milk may be increased over that illustrated in the drawings because the milk contracts considerably when it cools.

The filled milk container would then be illustrated by Fig. 10. The closures 38 and 39 are preferably provided with indicia for the purpose of indicating which one is to be used for pouring milk and which one is to be used for pouring cream. For example, the closure 39 might have the indicia "Pour here for cream," and the closure 38 might have the indicia "Pour here for milk."

Fig. 11 illustrates the condition when the container is filled, with the closure 39 opened, for the purpose of pouring cream from the container. In such case the cream, being on the upper side and at the right of the partition in Fig. 11, it will pour through the aperture 35, while the milk will be retained in the lower part of the container, which is shown at the left in Fig. 11, by the partition 50.

The air in the space above the liquid, which is ordinarily just below the cover 28, passes toward the left into the lower chamber 58, and occupies that space which is above the level of the edge 55 of the aperture 57. The pouring of all of the cream out of the upper chamber 59 depends on the partition 50 extending upward to a sufficient height when the container is horizontal, to keep the milk in the chamber 58.

Assuming the space below the partition to be filled with milk, as the container is tilted to pour cream, a small amount of milk may pass through the partition aperture to be displaced by air, which appears above the free surface of the milk. This milk leakage can be kept down to a minimum by making the aperture 57 as small as possible and keeping the aperture 57 close to the wall or corner.

I have found that when the aperture in the partition is enlarged to approximately one-fourth of the total area of the partition, the cream pouring feature is retained to substantially the same extent or better than the conventional glass milk bottle of the prior art and at the same time it is possible to mix the cream and milk when desired, if the partition aperture is of this size. With such a fairly large partition aperture, the carton may be inverted and the cream will pass through the aperture more freely than if a smaller aperture is used, and will become mixed with the milk if the carton is inverted several times.

In other embodiments of the invention, where relatively small partition apertures are used, my experiments indicate that substantially 98% of the pure cream may be poured off by the use of the container embodying my invention. Thus, the extremely small partition aperture is advantageous from the point of view of reducing dilution of the cream by milk, but the larger partition apertures have the advantages of permitting voluntary mixing of the cream and milk more readily, and they may also facilitate the filling of the carton through the partition aperture from the top.

Referring to Fig. 12, this shows the same container in the course of the pouring of combined milk and cream. In this case the pouring aperture 36 is used, the closure 38 being lifted; and as the partition aperture 57 is downward, both the cream and the milk may pass out of the container. Cream comes downward out of the chamber 59, and at the same time milk passes out of the chamber 58.

The aperture 57 in this case should be large enough to permit bubbles to pass not only into the chamber 59, but also into the chamber 58. The sizes of the apertures illustrated are adapted to accomplish this result.

Referring to Fig. 13, this is a fragmentary axial cross-sectional view through a milk container constructed of relatively cheap material, such as paper or cardboard, in which a partition is provided by using two closely nesting containers, the upper and inner one of which is indicated by the numeral 90 and the outer and lower one by the numeral 91. The container 90 is of such length that it forms the upper chamber for the cream and its bottom wall is provided with a suitable aperture 92 located near one of the side walls to provide the aperture in the partition. The bottom wall 93 is adapted to be located at the cream line.

The larger container 91 is of such length that it is adapted to receive the smaller container 90 in its upper end with the upper edges of the walls of these two containers flush and the two containers frictionally engaging each other. Then both containers may be closed at the top and simultaneously sealed by crimping over the edge 94 of the cover 95 which may be of the same construction as illustrated, for example, in Fig. 8 or Fig. 1.

I desire it to be understood that in some embodiments of the invention the cap may be made imperforate so that by the use of a suitable tool, an aperture may be made at the proper point for discharge of cream or milk as desired, but in such cases the container should bear suitable indicia indicating the location of the partition aperture or indicating where holes should be made in the cover to pour cream or milk.

It will thus be observed that I have invented an improved milk container, which may be embodied in a number of different forms. My milk container is adapted to permit the user to see at any time whether there is cream or milk in the container, and by tilting a partially filled container he may also judge of the amount of milk in it. The cream may be poured off without disturbing the milk, and the milk retained in the container, or both the cream and milk may be poured off simultaneously.

The present containers may be manufactured so cheaply that they may be thrown away after use, and thus the necessity for returning containers such as glass milk bottles, is entirely eliminated.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

A milk container comprising a member having substantially rectangular sides, top, and bottom, said container being provided on one of its sides with a longitudinally extending opening located to extend above and below the cream line in said container, and said opening being covered by a layer of transparent resin cemented to the wall of said container on said side, said container being provided on its inside with a transversely extending partition of substantially rectangular shape, with one corner cut away, said partition having a depending attaching flange on each of the four sides of said partition, and said flange engaging the inside of the walls of said container and being secured thereto, said partition being located substantially at the division line between the cream and the milk in said container, and said partition sloping upwardly from the corner opposite to said cut-away corner, toward the diagonal edge of the corner which is cut away, and said member having in its upper wall a pair of apertures provided with closures, said apertures being located in two opposite corners of said upper wall, and one of said apertures being located above the cut-away portion of said partition, the latter aperture being provided with indicia indicating that milk may be poured out of said latter aperture, and the other aperture being provided with indicia indicating that cream may be poured out of said other aperture.

JOSEPH F. COURTNEY.